United States Patent [19]

Yeh

[11] Patent Number: 5,255,148

[45] Date of Patent: * Oct. 19, 1993

[54] AUTORANGING FAULTED CIRCUIT INDICATOR

[75] Inventor: Thomas Yeh, South Weymouth, Mass.

[73] Assignee: Pacific Scientific Company, Weymouth, Mass.

[*] Notice: The portion of the term of this patent subsequent to Jan. 8, 2008 has been disclaimed.

[21] Appl. No.: 572,906

[22] Filed: Aug. 24, 1990

[51] Int. Cl.⁵ .............................................. H02H 3/00
[52] U.S. Cl. ..................................................... 361/93
[58] Field of Search .................. 361/93, 63, 78, 57, 361/94; 324/500, 522

[56] References Cited

U.S. PATENT DOCUMENTS

| | | | |
|---|---|---|---|
| 4,631,625 | 12/1986 | Alexander et al. | 361/94 |
| 4,984,124 | 1/1991 | Yeh | 361/93 |
| 5,029,039 | 7/1991 | Yeh | 361/93 X |

Primary Examiner—Steven L. Stephan
Assistant Examiner—E. To
Attorney, Agent, or Firm—Lahive & Cockfield

[57] ABSTRACT

The disclosed fault indicator which senses current in a cable, resets in response to a minimum current and trips when the current exceeds a predetermined multiple above the average value of the current. A trip circuit senses the average value by periodic current sampling or by continuous current averaging. Maximum and minimum trip setting limit the excursion of the multiple of the average value.

18 Claims, 3 Drawing Sheets

AUTORANGING FAULTED CIRCUIT INDICATOR

RELATED APPLICATIONS

This application is related to the applications Ser. No. 503,483 filed Apr. 6, 1990 and Ser. No. 390,541 filed Aug. 7, 1989 both of Thomas Yeh for Current Adaptive Fault Indicator, and both assigned to the same assignee of this application.

BACKGROUND OF THE INVENTION

This invention relates to faulted circuit indicators (FCIs or Fault Indicators), and particularly to fault indicators which dynamically accommodate themselves to variations of load conditions in a power distribution network.

A conventional fault indicator signals that current above a predetermined magnitude, i.e. trip current has passed through a power cable. A public utility which uses the fault indicator requires the fault indicator to have a trip current value which exceeds the expected maximum current at the indicator installation site. This allows the fault indicator to remain inactive during maximum allowable current but to react to current produced when the circuit experiences a fault. To prevent the FCI from tripping due to temporary overloads and current transients, the utility specifies a trip rating with an added margin above the maximum load current at the indicator, for example, about two to three times the maximum load current. The particular value depends upon other features of the FCI and circuit conditions.

However, even the best determination of the maximum load current involves an educated estimate. Such estimates include maximum expected load current, not only for present use but for projected potential future load growth.

The estimates introduce uncertainty. In addition, each circuit in a power distribution system exhibits a different maximum expected full load current. In order to avoid selecting a different FCI trip value for each circuit, utilities select a compromise FCI trip rating for all FCIs among a number of circuits. While this avoids selecting different FCIs according to requirements of each installed circuit and misapplication of the numerous FCI ratings, it often represents an inadequate compromise for varied and changing load conditions.

OBJECTS AND SUMMARY OF THE INVENTION

An object of the invention is to overcome these difficulties.

According to a feature of the invention this object is attained by incorporating in the trip means selecting means for sensing the average value of the current sensed by said sensing means and selecting the trip value as a predetermined multiple above the sensed average value.

According to another feature of the invention, the trip means senses the average value continuously.

According to another feature of the invention, the trip means senses the average value with periodically sampling the current.

These features avoid an absolute trip value, but adjust the trip value on the basis of the loads of the installed system and simplify the application of the fault indicators. They avoid the uncertainty of the educated estimates of maximum load currents of the loads and substitute actual measurements of cable currents. They dynamically adjust the FCI to some value above the maximum normal load current magnitude of the installed circuit.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
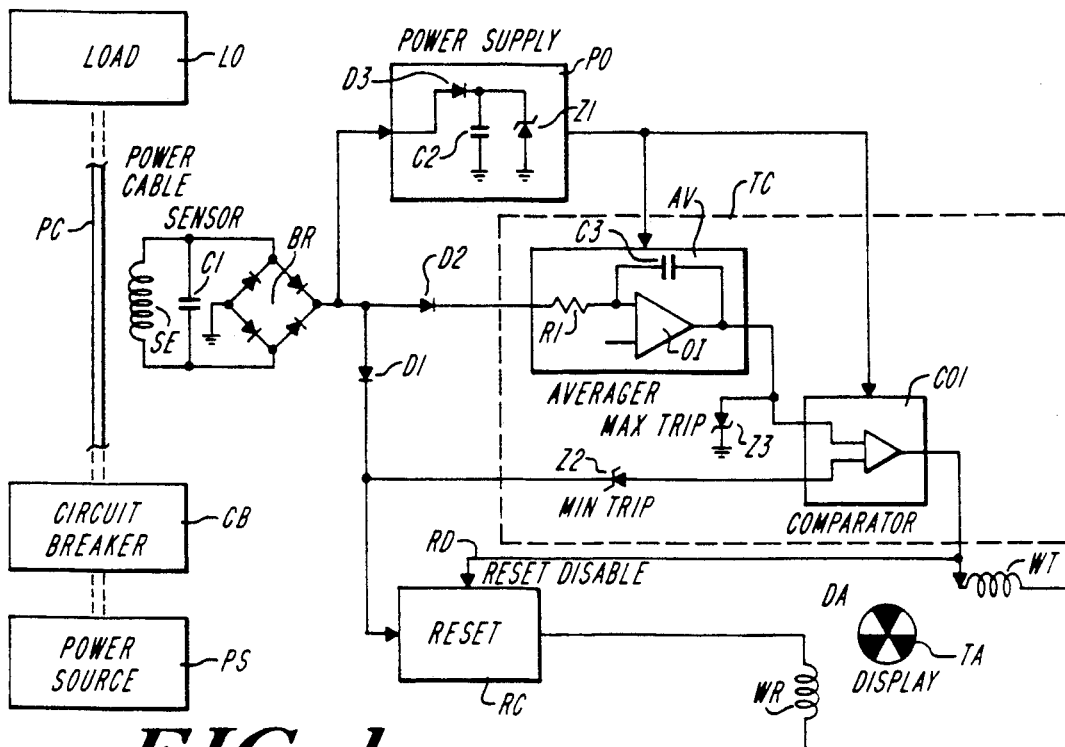
FIG. 1 is block diagram illustrating a faulted circuit indicator embodying features of the invention.

FIG. 1 illustrates an embodiment of the invention. Here, a power source PS energizes a load LO through a circuit breaker CB and a power cable PC. A fault indicator FCI1, which is one fault indicator among many along the power cable, responds to current in the power cable to indicate faults. In the indicator FCI1, an inductive sensor SE produces respective alternating voltages corresponding in amplitude to the amplitude of the alternating current it senses in the cable PC. A capacitor C1 tunes the inductive sensor SE to the frequency of the current in the cable PC. A bridge circuit BR rectifies the alternating current in the sensor SE to form an output voltage whose peak is proportional to the current flowing in the power cable PC. Three isolating diodes D1, D2, and D3 furnish the output voltage of the bridge circuit BR to a reset circuit RC, a trip circuit TC, and a power circuit PO that furnishes an energizing voltage Vcc to the elements of the fault indicator.

In the power supply PO a capacitor C2 captures the peak of the rectified output of the bridge BR and smoothes ripple. A 12 volt zener diode Z1 regulates the voltage across the capacitor C2 so the latter carries a 12 volt potential that serves as the voltage source Vcc for the elements of the circuit in the fault indicator FCI1.

The reset circuit RC responds to a minimum voltage Vmin at the bridge BR to produce a reset signal. The minimum voltage Vmin corresponds to a minimum current Imin in the cable PC. The reset signal energizes a reset winding WR in a fault display actuator DA which then drives a target (or display) TA to a visibly distinguishable reset position.

The trip circuit TC operates in response to the voltage at the bridge BR appearing at the diode D2 and representing a fault in the operating current in the cable PC. The trip circuit TC produces a trip signal through a trip winding WT in the display actuator which then drives the target TA to a visibly distinguishable trip position when the current in the cable PC sensed by the sensor SE exceeds a predetermined trip value.

To establish the trip value, the trip circuit TC includes an averaging circuit AV in the form of an operational integrator OI having an input series resistor R1 and a feedback capacitor C3. The averaging circuit AV performs a running average of the sampled current and generates a reference current signal for a comparator CO1. The comparator CO1 senses the current in the power cable PC through the sensor SE and the bridge BR at its other input and produces a signal through the trip winding WT at the display actuator to move the target TA to its trip position when the instantaneous current is above the trip current.

A reset-disable line RD passes the trip signal to the reset circuit RC to disable the reset circuit in response to a trip signal. The reset circuit RC then does not operate again until the circuit breaker CB stops the current in the power cable PC, the breaker CB closes, the current resumes and the current in the power cable PC exceeds the reset value.

The gain of the operational integrator OI and the resistance of the resistor R1 are sufficient to produce an output at a multiple, for example two, of the actual average value to produce the reference value or trip value.

The trip circuit now varies with the average reference level at twice the average level. Because the reference trip current may vary too widely, a zener diode Z2 establishes a minimum trip current, e.g. 100 amperes, to prevent false trip operation when the load LO is very light during the evening hours. During that time, the FCI senses the light load and adjusts the trip rating to be two times the level of the low load current. When the morning arrives and the load current may suddenly increase, the FCI whose reference is this low load current, is prone to trip falsely.

A zener diode Z3 prevents false operation during periods of heavy loading. Under these circumstances, the averaging circuit AV produces a trip rating which is very high, e.g. twice the already heavy load current. Such a trip value could prevent the FCI from registering a low magnitude fault. The zener diode Z3 establishes a maximum trip rating, such as 1000 amperes, to prevent the FCI from self adjusting the trip magnitude above the fault current produced by a low magnitude fault.

Within the minimum and maximum trip ratings, the FCI self adjusts the trip rating to a predetermined ratio above the current reference signal representing normal load current of the installed circuit.

Figure 2:
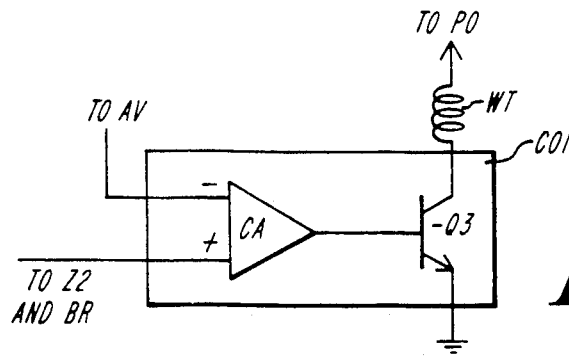
FIGS. 2 and 3 show details suitable for the circuit in FIG. 1.

FIG. 2 illustrates details of the comparator CO1 for energizing the winding WT. In the comparator CO1 a comparison amplifier CA goes positive when the output of the bridge BR exceeds the reference level from the averaging circuit AV. This turns on a transistor Q1 which drives current from the power supply PO through the winding WT. The latter sets the target TA to the trip indicating position.

Figure 3:
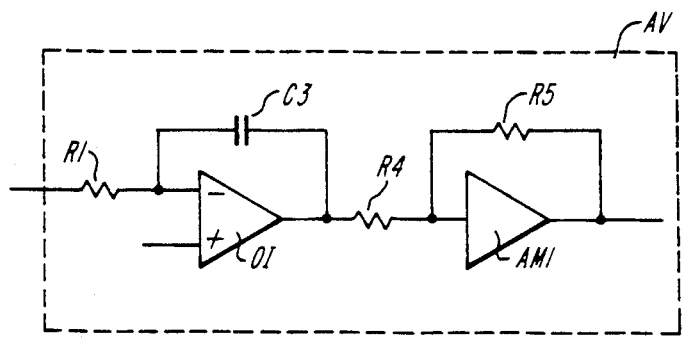

FIG. 3 illustrates another embodiment of the averaging circuit AV. Here, an operational amplifier AM with input resistor R4 and feedback resistor R5 set the reference level at a multiple of the average value. The ratio of the resistor R5 to R4 determines the amplification of the operational amplifier AM. If the overall amplification of the operational integrator OI with its resistor R1 and its capacitor C3 is unity, the ratio of R5 to R4 sets the multiple of the averaging circuit.

Figure 4:
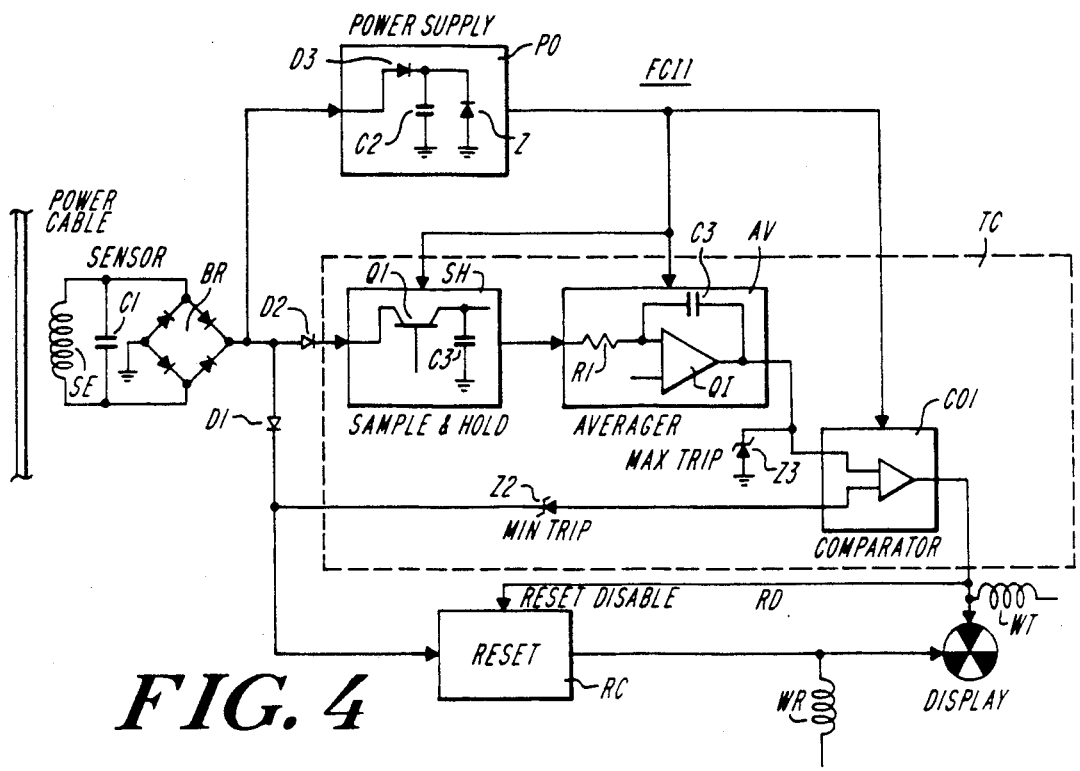
FIG. 4 is a block diagram illustrating another circuit embodying features of the invention.

FIG. 4 illustrates another embodiment of the invention. This circuit is substantially identical to that of FIG. 1 both with and without FIGS. 2 and 3. However, here, a sample and hold circuit SH in the trip circuit TC samples the current in the power cable PC periodically. In the sample and hold circuit, a transistor Q1 periodically supplies the voltage representing the current in the power cable PC and appearing at the bridge BR to a holding capacitor C3. A timer (not shown) renders the transistor Q1 conductive at predetermined times for specific periods.

The sample and hold circuit SH samples the current in the power cable PC to the load LO on a periodic basis. The averaging circuit AV produces a running average over an interval determined by the resistor R1 and the capacitor C3. The running sample average current information establishes the trip rating of the FCI.

The sample and hold circuit SH selects the sampling interval to obtain information regarding the current loading of the load LO under normal conditions. The running average serves to smooth out the contribution of transient overcurrents in the long term current information of the load. The gain of the averaging circuit AV produces a current reference that represents a multiple of the steady state load current value. The comparator CO1 compares the instantaneous load current value to the current reference which the sample and hold circuit SH and the average circuit AV establish. The FCI trips only when the instantaneous load current exceeds the current reference, i.e. is greater than the multiple of the average current.

Figure 5:
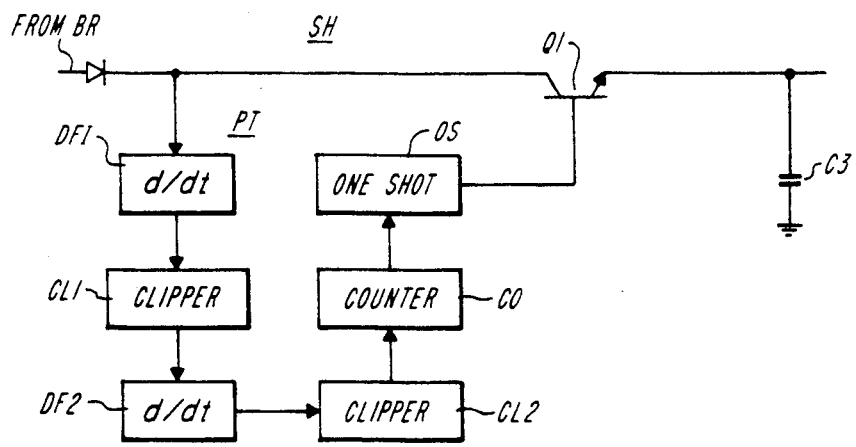
FIG. 5 shows details of the circuit in FIG. 4.

FIG. 5 illustrates details of the sample and hold circuit SH. Here, a differentiator DF1 differentiates the full-wave rectified voltage from the bridge BR. This produces a signal having negative going zero-crossovers during the peaks of the bridge BR voltage. A clipper CL1 clips the portion of the signal above a positive threshold and below a negative threshold to produce a square wave above and below a zero potential. A second differentiator DF2 differentiates the square wave going to produce positive and negative pulses. A second clipper CL2 clips off the positive pulses so that only the negative pulses representing the negative zero crossovers at the differentiator DF1, and occurring at the peaks of the half-wave voltage of the bridge BR, remain. The circuits DF1, DL1, DF2 and CL2 form a peak-time detector PT.

A counter CN counts the negative peaks and actuates a one-shot OS after a predetermined count. The one-shot produces a pulse which renders the transistor Q1 conductive during the peak of one out of a predetermined number of half waves. At the predetermined half wave the bridge BR charges the capacitor C2 to the value of the peak in that half wave. This voltage then appears at the input of the averaging circuit AV which averages the voltage over a period determined by the values of R1 and C3.

According to one embodiment, the peak time detector PT, the counter CN, and the one shot OS produce a sampling interval of 0.5 seconds or 30 full cycles of current in the cable PC. Thus the magnitude of currents to the load LO is sampled every 0.5 seconds. The averaging circuit AV produces a running average of ten sampling periods by means of resistor R1 and capacitor C3 to establish the average current reference. In this example, the normal circuit condition constitutes the current magnitude sampled occurring every 0.5 seconds by which the averaging circuit AV averages over each 5 second period. The comparator CO1 then trips when the instantaneous current of the load LO senses twice the reference current.

The sampling interval gains importance because the information establishing the current reference must limit sensitivity to fault conditions. In other words, the time constant of the current reference signal must not incorporate the magnitude of the fault current into the current reference signal when a fault occurs. Otherwise this would prevent the fault from being detected. A fast sampling interval, for example 1 cycle, coupled with a two cycle running average would produce a current reference signal that does not allow a fault current over one cycle in duration to register because it incorporates the fault magnitude into the current reference signal.

The time constant of the current reference signal must also be capable of maintaining pace with normal load fluctuations and avoid producing a false fault registration. Too long a time constant for the sample-running-average current reference could result in a rapid but normal load fluctuation which might make the FCI operate falsely.

In the circuit of FIG. 1, the circuit AV continuously averages the load current over an interval sufficiently long to produce a reference that is representative of the steady state load current. The averaging interval established by the capacitor C3 and resistor R1 produces a sufficient time constant to prevent incorporating fault current magnitudes into the current reference signal.

In FIG. 1, the continuously-average current reference signal programs the trip rating of the FCI. The comparator CO1 dynamically compares the instantaneous current magnitude of the load LO to the current reference signal. The FCI trips when the instantaneous load current is higher than the current reference signal.

Figure 6:
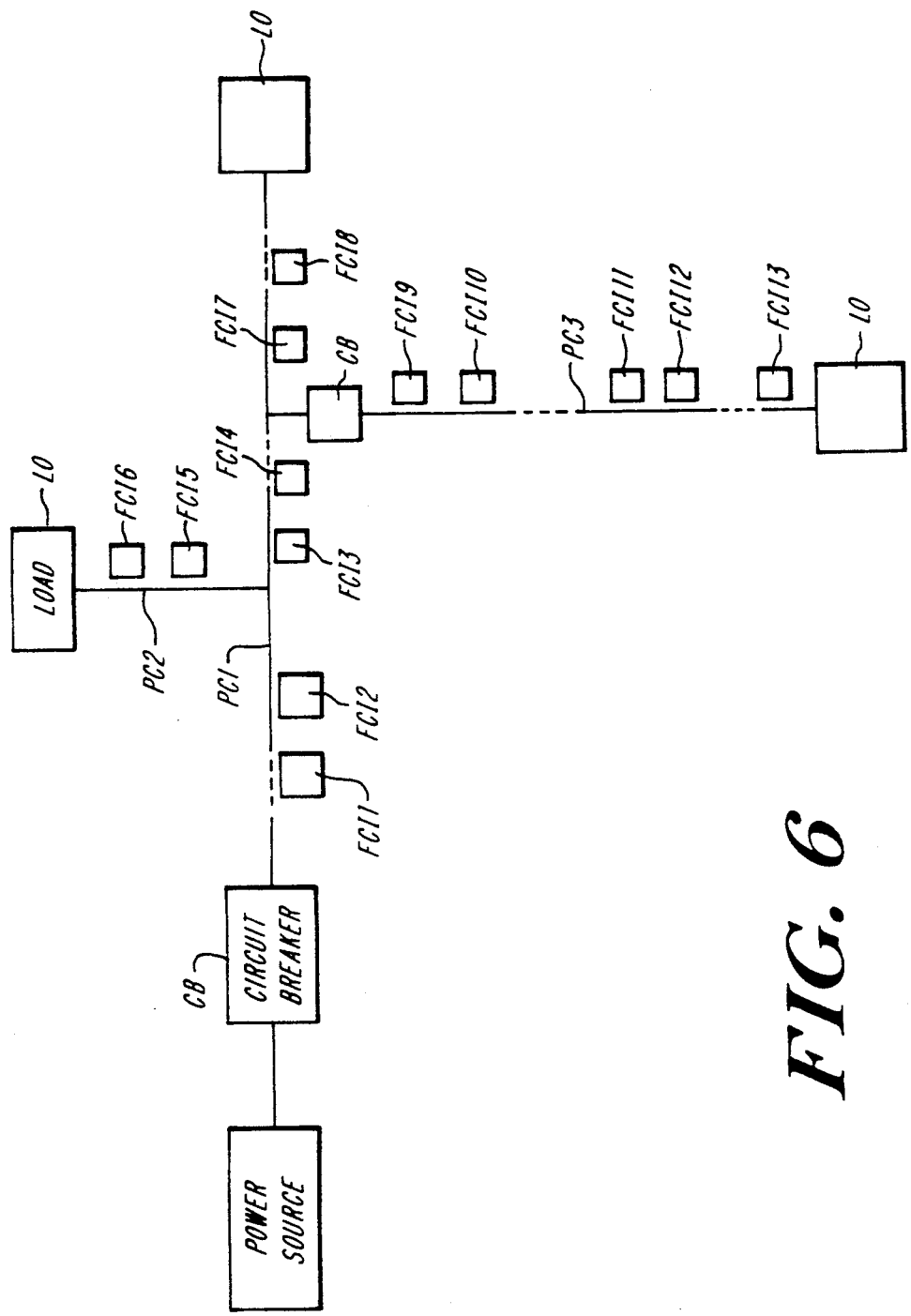
FIG. 6 is a network diagram illustrating a network embodying the inventions with FCI's as shown in FIGS. 1 to 5.

FIG. 6 illustrates a power distribution system in which various fault indicators FCI1, FCI2, FCI3,... FCIn sample currents through distribution cables PC1, PC2, ... PCn. Each of the fault indicators corresponds to the fault indicator FCI1 of either FIG. 1 or FIG. 4 alone or incorporating the structure of FIGS. 2, 3, and 5.

While embodiments of the invention have been described in detailed, it will be evident to those skilled in the art that the invention may be embodied otherwise without departing from its spirit and scope.

What is claimed is:

1. A fault indicator comprising:
   sensing means for sensing current in a cable;
   reset means responsive to said sensing means for producing a reset indication in response to a minimum current;
   trip means responsive to said sensing means for producing a trip indication in response to the current exceeding a selected trip value; and
   selecting means in said trip means for sensing the average value of the current and selecting a trip value as a predetermined multiple of the average value.

2. A fault indicator as in claim 1, wherein:
   said selecting means includes an averaging circuit and gain control means for establishing the predetermined multiple of the average value.

3. A fault indicator as in claim 1, wherein:
   said selecting means includes an averaging arrangement having a sample and hold circuit for sampling and holding samples of instantaneous outputs of said sensing means and an averaging circuit for producing the average of the output of said sample and holding means.

4. A fault indicator as in claim 1, wherein:
   said selecting means includes an averaging circuit coupled to said sensing means for producing an average value; and a comparator coupled to said sensing means for comparing the average value with an output of said sensing means.

5. A fault indicator as in claim 4, wherein:
   said selecting means includes a regulator connected to said comparator from said sensing means for applying only a minimum trip value to said comparator.

6. A fault indicator as in claim 4, wherein:
   said selecting means includes a limitor connected between said average circuit and said comparator for limiting the input to said comparator to a maximum trip value.

7. A fault indicator as in claim 4, wherein:
   said averaging circuit includes an operational integrator.

8. A fault indicator as in claim 4, wherein said averaging circuit includes an operational integrator and an operational amplifier connected to said operational integrator.

9. A fault indicator as in claim 3, wherein:
   said sample and hold circuit includes a first differentiator coupled to said sensing means;
   a first clipper coupled to said first differentiating means;
   a second differentiating means coupled to said first clipper;
   a second clipper coupled to said second differentiating means;
   a counter coupled to said second clipper for counting the number of pulses appearing at the output of said second clipper;
   a one shot circuit connected to the counter;
   a capacitor;
   a switch connecting said capacitor to said sensing means and having a control element connected to said one shot circuit.

10. A power distribution system, comprising:
    a plurality of cables;
    a circuit breaker connecting said cables to a power source;
    a plurality of fault indicators coupled to said cables;
    each of said fault indicators including sensing means for sensing current in the cables;
    each of said fault indicators including reset means responsive to said sensing means for producing a reset indication in response to a minimum current;
    each of said fault indicators including trip means responsive to said sensing means for producing a trip indication in response to the current exceeding a selected trip value; and
    each of said fault indicators including selecting means in said trip means for sensing the average value of the current and selecting a trip value as a predetermined multiple of the average value.

11. A system as in claim 10 wherein:
    said selecting means includes an averaging circuit and gain control means for establishing the predetermined multiple of the average value.

12. A system as in claim 10, wherein:
    said selecting means includes an averaging arrangement having a sample and hold circuit for sampling and holding samples of instantaneous outputs of said sensing means and an averaging circuit for producing the average of the output of said sample and holding means.

13. A system as in claim 12, wherein:
    said selecting means includes an averaging circuit coupled to said sensing means for producing an average value; and a comparator coupled to said sensing means for comparing the average value with an output of said sensing means.

14. A system as in claim 12, wherein:
said selecting means includes a regulator connected to said comparator from said sensing means for applying at least a minimum trip value to said comparator.

15. A system as in claim 12, wherein:
said selecting means includes a limitor connected between said average circuit and said comparator for limiting the input to said comparator to a maximum trip value.

16. A system as in claim 12, wherein:
said averaging circuit includes an operational integrator.

17. A system as in claim 12, wherein said averaging circuit includes an operational integrator and an operational amplifier connected to said operational integrator.

18. A system as in claim 11, wherein:
said sample and hold circuit includes a first differentiator coupled to said sensing means;
a first clipper coupled to said first differentiating means;
a second differentiating means coupled to said first clipper;
a second clipper coupled to said second fifferentiating means;
a counter coupled to said second clipper for counting the number of pulses appearing at the output of said second clipper;
a one shot circuit connected to the counter;
a capacitor;
a switch connecting said capacitor to said sensing means and having a control element connected to said one shot circuit.

* * * * *